April 4, 1967  O. N. BRYANT  3,312,241
FLUID CONTROL APPARATUS
Filed April 16, 1964  2 Sheets-Sheet 1

WITNESSES:
John L. Chopp
James F. Young

INVENTOR
Ozro N. Bryant
BY
Frank Cristiano Jr.

United States Patent Office 3,312,241
Patented Apr. 4, 1967

3,312,241
FLUID CONTROL APPARATUS
Ozro N. Bryant, Chester, Pa., assignor to Westinghouse Electric Corporation, East Pittsburgh, Pa., a corporation of Pennsylvania
Filed Apr. 16, 1964, Ser. No. 360,280
3 Claims. (Cl. 137—599)

This invention relates to fluid control apparatus, more particularly to valve structure for controlling flow of fluid, and has for an object to provide an improved structure of this type.

Another object of the invention is to provide a dual grid valve structure.

A further object is to provide a grid valve structure for controlling flow of pressurized fluid, wherein the unbalancing forces of the fluid pressure drop across the valve during closure are modified.

A still further object is to provide a dual grid valve structure, wherein the fluid flow through the stationary grid member is controllable by two individually and separately operable grid members.

Yet another object is to provide a dual valve structure that is of considerably smaller physical size and weight, more compact, and far less costly to manufacture than valves heretofore required for the same application.

This invention is primarily directed, though not limited, to valves which are movable from the fully open position to the fully closed position, thereby to permit either full flow of fluid or interrupt flow. Such valves are usually termed "intercept" valves or "stop" valves in multi-unit steam turbine apparatus, and are required to close rapidly, when so indicated by turbine overspeed conditions and/or loss of load on the turbine units, thereby to interrupt the flow of motive steam through the turbine units in the shortest possible time with attendant protection of the apparatus and personnel.

In steam conduits employed in turbine apparatus of the above type, two such valves are employed in series, for safety purposes, i.e., an "intercept" valve and a "stop" valve, each of which is operable in response to separate control signals indicative of abnormal and dangerous turbine apparatus conditions requiring immediate "shutdown" or deenergization of the turbine units. Hence, if both valves and their controls are functioning properly, the "intercept" valve closes first to interrupt the steam flow and the stop valve closes moments thereafter. However, if one of the valves or its control is inoperative, the other valve assures interruption of steam flow.

Since valves for the above type of service are quite large, they are quite expensive. For example, a pair of such valves at this time is worth about $60,000. In contradistinction thereto, a dual valve structure for the same service and formed in accordance with the invention is estimated to cost about $13,500, thereby involving a saving of about $46,500 or 77.5%. In addition, further economies are provided with regard to the mounting arrangement of the dual valve because of its considerably lesser weight and physical size.

Briefly, in accordance with the invention, there is provided a valve structure comprising a stationary plate or grid member having a plurality of ports arranged in a pattern, and first and second movable plates or grid members each having a plurality of openings corresponding in number and size and arranged in the same pattern as the ports. The grid members are disposed in a mutually abutting stack, with the stationary grid preferably interposed between the movable grid members. Means such as hydraulic power actuators are further provided for actuating the movable grid members individually into and out of blocking relation with the ports in the stationary grid member. Hence, fluid flow through the valve structure may be interrupted by either or both of the movable grid members.

The movable grid members may be biased to their port blocking positions and maintained in their port unblocking positions by the hydraulic fluid acting in the hydraulic power actuators. With this arrangement, the apparatus is of the "fail-safe" type, i.e., should the actuating fluid pressure be lost for any reason, the movable grid members are returned to their port blocking positions.

Grid valves, when employed to control pressurized fluid, are subject to large unbalancing forces due to the fluid pressure drop thereacross during closure and when closed. These unbalancing forces in some instances increase the sliding frictional forces, thereby requiring more power to move the movable grid member. In other instances, the unbalancing forces cause separation of the grid members, thereby initiating fluid leakage in the port blocking position.

Another feature of the invention resides in provision of means responsive to the pressure of the fluid being controlled to minimize the effect of the unbalancing forces on the movable grid members, thereby rendering the valve structure more reliable and operable with less expenditure of actuating power.

The above and the objects are effected by the invention as will be apparent from the following description and claims taken in connection with the accompanying drawings, forming a part of this application, in which:

Figure 1:
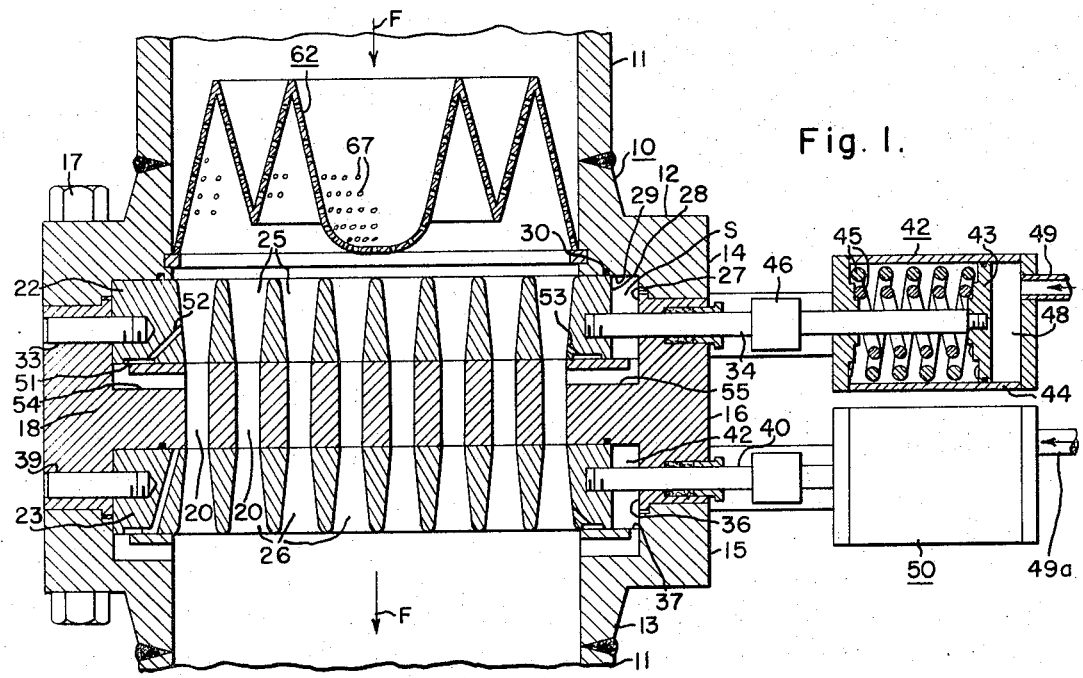
FIGURE 1 is a longitudinal sectional view of a dual grid valve structure formed in accordance with the invention, the valve structure being shown in the "fully open" position.
Figure 2:
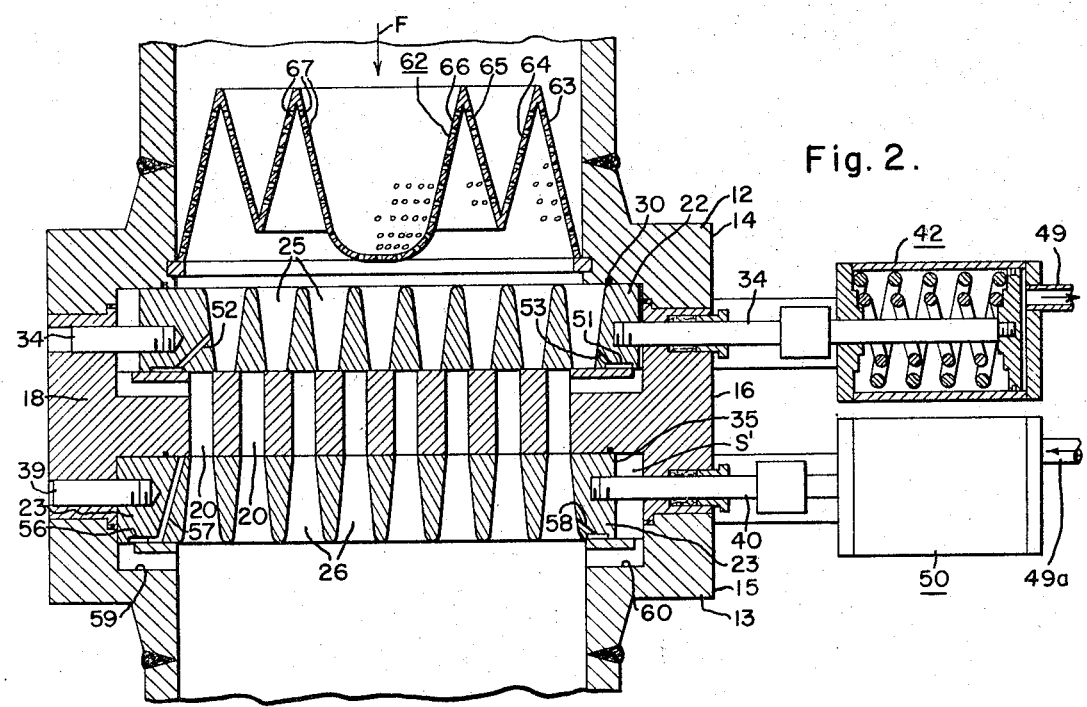
FIG. 2 is a longitudinal sectional view similar to FIGURE 1, but with one of the grid members in the "fully closed" position.
Figure 3:
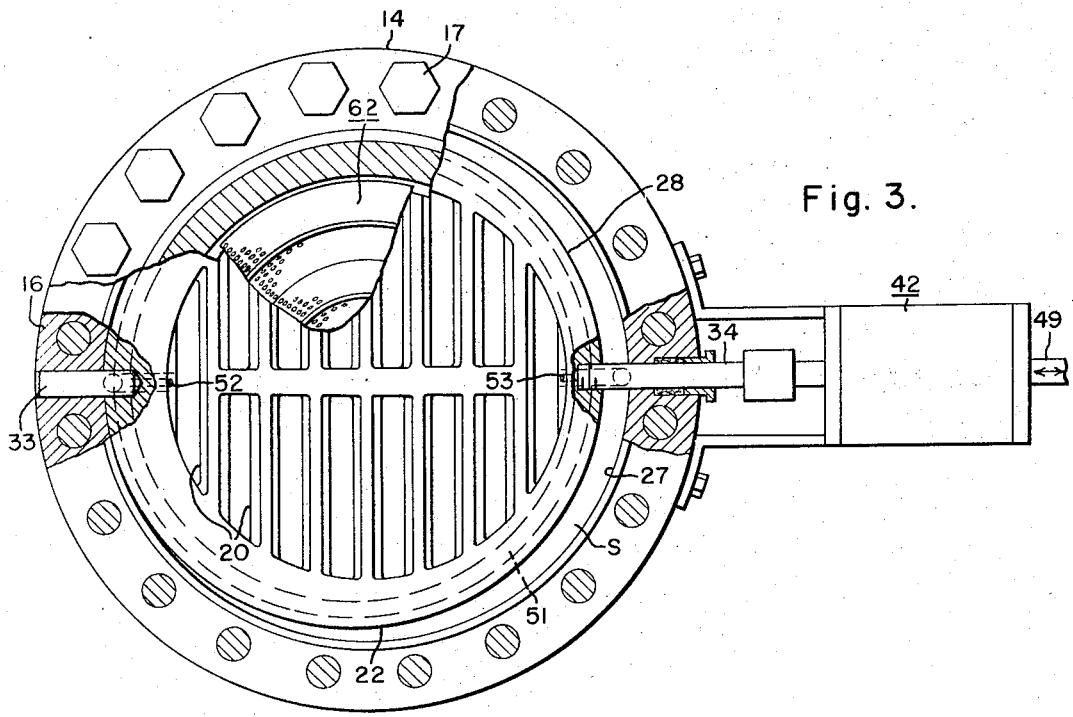
FIG. 3 is a plan of the valve structure shown in FIGURES 1 and 2, with portions cut away to show internal structure.

Referring to the drawings in detail, in FIGURES 1 to 3, inclusive, there is shown a dual valve structure, generally designated 10, formed in accordance with the invention. This valve structure is of the type generally known as a grid valve. As illustrated, the grid valve 10 is interposed in a fluid flow conduit 11 and is employed to control flow of pressurized fluid therethrough, for example, in a direction parallel to the longitudinal axis, as indicated by the arrows F. The grid valve structure is provided with a housing structure comprising an upstream tubular portion 12, a downstream tubular portion 13, each of which is provided with circular peripheral flanges 14 and 15 respectively, and a central tubular portion 16. The housing portions 12, 13 and 16 are fastened to each other in any suitable manner, for example, by an annular array of bolts 17 extending therethrough. Within the housing structure there is provided a stationary plate or grid member 18, which may be formed as a part of the central housing portion 16, if desired, and is provided with a plurality of ports 20 disposed in a predetermined pattern as illustrated in FIG. 3. There are further provided an upstream movable plate or grid member 22 and a downstream movable plate or grid member 23 disposed in cooperative and slidable abutment with the opposite faces of the stationary grid member 20. The upstream plate member 22 is provided with a plurality of openings or apertures 25 of substantially the same size and configuration as the ports 20 in the stationary plate member 18 and arranged in the same pattern. In a similar manner, the downstream plate member 23 is provided with a plurality of openings 26 of substantially the same size and configuration as the ports 20 and arranged in substantially the same pattern. However, the openings 25 in the upstream plate 22 are convergent in the direction of fluid flow therethrough for optimum fluid dynamic considerations and, for similar considerations, the downstream plate member 23 has its openings 26 formed in a divergent manner with respect to fluid flow therethrough. Hence, the openings 26 are of the type well known in the art as diffusing openings.

As illustrated in FIGURE 1, the valve 10 is disposed in the fully open position, that is, both of the movable plate members 22 and 23 are disposed with their openings 25 and 26, respectively, in registry with the ports 20 in the stationary plate member 18. However, in a manner subsequently to be described in detail, the movable plate members 22 and 23 are individually slidable to the right when viewed as in FIGURE 1 to selectively block the ports 20 in the stationary plate member 18.

The central housing portion 16 is provided with an axial bore defined by an internal wall surface 27 of generally circular cross-sectional shape and, in a similar manner, the movable plate member 22 is provided with peripheral wall surface 28 of substantially circular shape but formed of two non-concentric semi-cylinders. The plate member 22 is of somewhat smaller cross-sectional area than that of the bore defined by the internal wall 27. Hence, the movable plate 22 is freely movable from the position shown in FIGURE 1 to the position shown in FIG. 2 within the central housing 16, thereby to block the ports 20 in the stationary plate member 18. The upstream housing portion 12 is also provided with an internal bore partly defined by an annular face 29 which cooperates with the central housing portion 16 to enclose the upstream plate member 22 and retain it in slidable abutment with the stationary plate member 18. In addition thereto, the upstream housing portion 12 is provided with a ring-shaped sealing member 30 disposed in the annular face 29 and cooperating with the upper face of the upstream plate 22 to minimize leakage therepast of the fluid being controlled.

The movable plate member 22 is maintained in the central housing portion 16 for slidable rectilinear translation therewith by diametrically opposed and coaxially aligned rod members 33 and 34 slidably received in suitable bores in the central housing portion 16 and firmly attached to the movable plate member 22.

In a similar manner, the downstream plate member 23 is of generally circular shape with a peripheral surface 35 similar to the surface 28 and is received in a generally circular bore defined by a circular internal wall surface 36 formed in the central housing portion 16. The cross-sectional area of the downstream plate member 23 is somewhat smaller than the cross-sectional area of the bore defined by the wall 36, so that the downstream plate member 23 is freely translatable therein in the same manner as the upstream plate member 22. The downstream plate member 23 is retained in slidable abutment with the lower face of the stationary plate member 18 by an upper wall surface 37 formed in the lower housing portion 15 and is guided for rectilinear translation by a pair of diametrically opposed rod members 39 and 40 slidably received in the central housing 16 and firmly attached to the downstream plate member 23.

The upstream plate 22 is preferably actuated by a hydraulically actuated device 42 comprising a piston 43 slidably received in a cylinder 44 and biased to the right by helical spring members 45. The piston 43 is connected to the rod 34 by a suitable coupling 46 and the device 42 is rigidly attached to the central housing 16. The piston 43 and cylinder 44 jointly define a chamber 48 at the right of the cylinder 44. When a hydraulic fluid is delivered to chamber 48 by a suitable conduit 49, the fluid exerts a force to the left on the piston 43 sufficient to overcome the bias of the springs 45 and maintain the upstream plate member 22 in the port unblocking position shown in FIGURE 1. When the fluid pressure in chamber 48 is relieved, the biasing forces of the springs 47 will return the plate member 22 to the blocking position shown in FIG. 2.

In a similar manner, the downstream plate member 23 is connected by its rod 40 to a hydraulically actuated device 50 similar to the device 42 described above and operable in the same manner. Hence, when the hydraulically actuated device 50 is provided with pressurized hydraulic fluid by conduit 49, the downstream plate member 23 is maintained in the unblocking position shown in FIGURE 1 and, when the fluid in the hydraulic actuator 50 is relieved, the spring bias (not shown) within the actuator 50 will return the downstream plate member 23 to the port blocking position.

In operation, when the valve structure 10 is subjected to pressurized fluid flow F, as the upstream plate member 22 is moved toward its port blocking position, the fluid pressure drop thereacross progressively increases. The fluid pressure drop is effective to bias the upstream plate member 22 in downward direction into progressively tighter frictional abutment with the upper face of the stationary plate member 18 and conversely, when the downstream plate 23 is moved towards its port blocking position, the fluid pressure drop thereacross is effective to progressively reduce the abutment forces between the downstream plate member 23 and the lower face of the stationary plate member 18. Hence, the upstream plate member 22, as thus far described, would be very difficult to slide relatively to the stationary plate member 18 and would require a large expenditure of hydraulic force by the actuator 42. Conversely, although the frictional forces in the downstream plate member 23 are minimized, leakage at the abutting faces of these members would be induced by the pressure drop of the fluid F when the downstream plate member 23 is in the port blocking position (not shown).

To overcome the above-mentioned fluid pressure drop forces which act to unbalance the valve structure as described, the upstream plate member 23 is provided with an annular recess 51 disposed in its lower face and a pair of diametrically opposed passages 52 and 53 providing a fluid flow communication between the openings 25 in the upstream plate and the recess 51. The stationary plate member 18 is provided with a pair of diametrically opposed flow passages 54 and 55 arranged to provide fluid communication between the ports 20 and the recess 51. The recess 51 and the flow passages 54 and 55 are so arranged that when the upstream plate member 23 is disposed in the unblocking position shown in FIGURE 1, with attendant small pressure drop thereacross, a small amount of fluid is permitted to flow through the flow passage 52 and the recess 51 to the passageway 54 and then downwardly through the ports 20. However, as the upstream plate member 22 is moved towards the port blocking position by the actuator 42, with attendant increase in pressure drop thereacross, the recess 51 is moved out of registry with the passage 54 and fluid flow therethrough is prevented. Accordingly, the fluid pressure buildup in the recess 51 is effective to provide a modifying force opposing the force of the pressure drop on the movable plate 22 and tending to lift the upstream plate member 22 from abutment with the stationary plate 18, thereby facilitating movement of the upstream plate member by the actuator 42. Also, during such movement any fluid under pressure in the spaces 27 caused by possible leakage past the seal ring 30 is bled through the passage 55. The magnitude of the modifying force of the fluid in the recess 51, during movement of the upstream plate from the position shown in FIGURE 1 to the position shown in FIG. 2, may be varied as desired, by properly proportioning the surface area of the recess 51. For example, assuming that the pressure of the fluid F is equal to 500 p.s.i. and the surface of the upstream plate member 22 exposed to such fluid is equal to 200 sq. inches, when the plate 22 is in the port blocking position it is subject to a pressure drop of 500 p.s.i. and the unbalance across the plate 22 would be 200×500 or 100,000 lbs. By forming the area of the recess 51 equal to 200 sq. inches, it will be seen that the modifying force opposing the abutment force of the fluid pressure drop will then equal 200×500 or 100,000 lbs., thereby nullifying the effect of the pressure drop on the upstream plate 22 when it is moved to the port blocking position. However, it will be now seen that by making the area of the recess 51 smaller, the modifying or opposing force may be made smaller if so desired.

It must be pointed out that the leakage flow through the flow passage 53, the recess 51 and the flow passage 55, when the upstream plate 22 is in the flow blocking position shown in FIG. 2 is so small that for all practical purposes it may be disregarded.

In normal operation, the valve structure 10 operates in such a manner that the upstream plate member 22 is moved to the flow blocking position before the downstream plate member 23 is moved to the flow blocking position (not shown). Accordingly, the force unbalance which has been described in conjunction with the upstream plate member 22 does not normally exist with respect to the downstream plate 23. However, in the event that the movable plate 22 remains in the unblocking position, for any malfunction reason, the downstream plate is subjected to substantially the same unbalancing force magnitude when moved to the port blocking position. To overcome such possible unbalance, the downstream plate member 23 may also be provided with an annular recess 56 in its lower face and flow passages 57 and 58 communicating with the apertures 26 in the downstream plate 23. These flow passages 57 and 58 are diametrically opposed and are formed in such a manner that the flow passage 58 is always open to the fluid flow in the openings 26, while the passageway 57 is arranged in such a manner that when the downstream plate 23 is in the unblocking position shown in FIG. 2, fluid flow therethrough is blocked by the stationary plate 18. As the downstream plate member 23 is moved to the right to the blocking position, fluid is also admitted to the recess 56 by flowing through the passage 57. The lower housing 15 is provided with a pair of diametrically opposed flow passages 59 and 60 similar to the flow passages 54 and 55 and arranged in such a manner that, when the downstream plate 23 is in the port unblocking position, fluid in the recess 56 is permitted to flow through the flow passage 59. However, as the downstream plate 23 is moved to the right to the port blocking position with attendant increase in pressure drop thereacross, the recess 58 is moved out of registry with the flow passageway 59 so that a buildup in fluid pressure is obtained in the recess 56 to provide an upward force, thereby minimizing the effect of the downward force of the pressure drop. It will be further noted that, during movement of the downstream plate 23 to the port blocking position, any fluid that has become entrapped in the space S' between the downstream plate 23 and the lower housing 15 at the right thereof will be caused to flow through the passageway 60 and down into the conduit 11, thereby minimizing the opposing force of any such fluid on the power actuator 50. Here again, the surface area of the recess 56 may be selected as desired to provide any amount of opposing force to maintain the downstream plate member 23 in more firmly sealing relationship with the downstream face of the stationary plate 18.

If desired, a suitable filter or strainer 62 may be provided upstream of the upstream plate member 22 to prevent foreign matter from damaging the apparatus to which the fluid flow is to be provided by the conduit 11. As illustrated, the strainer member 62 comprises a series of frustoconical surfaces 63, 64, 65 and 66 joined to each other at their peripheries to provide a substantially large filtering surface in a relatively compact arrangement. The strainer 62 is provided with the usual large plurality of closely spaced apertures 67 of predetermined size and number to permit the fluid to flow therethrough with minimum drop of pressure.

Figure 4:
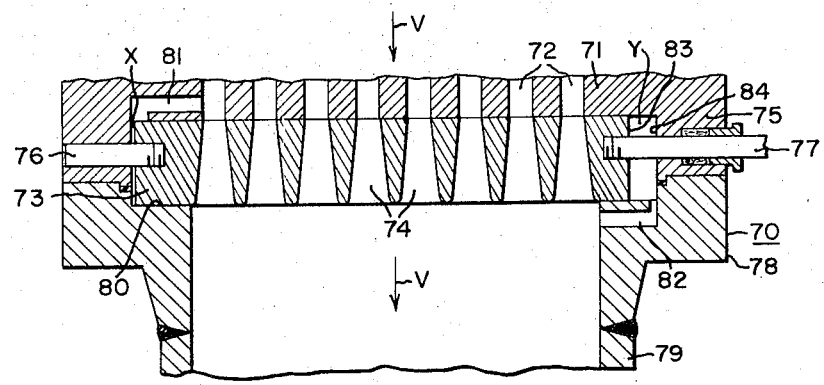
FIG. 4 is a fragmentary longitudinal sectional view of another embodiment.

In FIG. 4 these is shown another modification of the pressure balancing arrangement shown in FIGS. 1 to 3 inclusive. This figure shows only a portion of a grid valve structure 70, since the portions not shown may be substantially identical to the first embodiment already described.

The grid valve structure 70 comprises a stationary grid or plate member 71 (which may be identical to the plate member 18 in the first embodiment) having a plurality of ports 72 and a movable grid or plate member 73 disposed in slidable abutment therewith. The movable plate member 73 is provided with a plurality of openings 74 adapted to registed with the ports 72 and will be termed the downstream plate, since it is disposed downstream of the stationary plate 71 with respect to the direction of fluid flow therethrough, as indicated by the arrows V.

As in the first embodiment, the stationary plate 71 may be formed as a part of the central tubular housing portion 75 and the movable downstream plate 73 is guided for rectilinear movement from the port unblocking position shown to the port blocking position (not shown), by a pair of diametrically opposed rod members 76 and 77. As illustrated, the rod members 76 and 77 are slidably received in the housing portion 75 and rigidly attached to the downstream plate 73. Also, the downstream plate 73 may be actuated by a suitable power actuator (not shown) connected to the rod member 77.

The downstream plate 73 is supported in slidable abutment with the stationary plate 71 by a lower housing portion 78 of tubular shape suitably attached to the central housing portion 75 and connected to a conduit 79.

Accordingly, when the valve structure is in the port unblocking position shown, pressurized fluid V is permitted to flow through the valve structure 70 to the conduit 79, with substantially little pressure drop. However, as the movable downstream plate is moved from the unblocking position, the pressure drop progressively increases until, in the blocking position the pressure drop across the movable plate is equal to the full pressure of the thus blocked fluid. This pressure drop increases the forces tending to bias the movable plate 73 against the supporting face 80 of the downstream housing portion and would require a large amount of power to move the movable plate to the port blocking position.

To minimize the pressure unbalance during such movement, the left-hand portion of the stationary plate 71 is provided with a passageway 81 extending toward the movable plate 73 and communicating with a crescent-shaped space X between the plate 73 and the left-hand portion of the central housing 75, and the downstream housing portion is provided with a diametrically opposed passageway 82 providing a communication between the region downstream of the movable plate 73 and a crescent-shaped space Y between the movable plate 73 and the right-hand portion of the central housing portion 75 in the position shown. The crescent-shaped spaces X and Y may be attained by forming the movable plate 73 with a circular periphery 83 and the bore of the central housing 75 with a generally elliptical internal wall 84 that is elongated along the line of movement of the plate 73.

During operation, as the movable plate 73 is translated to the right towards the port blocking position, any fluid trapped in the space Y is freely pumped therefrom through the passageway 82 to the conduit 79. Concomitantly therewith, the pressurized fluid V enters the space X and exerts a pressure on the movable plate 75 towards the right, thereby reducing the force that would otherwise be required to move the latter.

It will now be seen that the invention provides a highly improved dual valve structure of the grid type which is extremely compact, thereby requiring considerably less material in its manufacture than heretofore for two valves to provide the same function.

It will further be seen that the invention provides a grid valve structure in which the usually large and objectionable unbalancing forces across the grid or plate members are modified in a simple manner to provide more freedom of motion to the movable plate members with less power expenditure for such movement.

In addition to the above, it will also be seen that the invention provides a dual grid valve structure in which the stationary plate member is cooperatively associated with the two movable plate members in such a manner that fluid flow therethrough may be blocked by either one independently of the other. That is, the stationary plate member and the upstream plate member jointly cooperate to form one valve structure and the stationary plate member and the downstream plate member jointly cooperate to form a second valve structure.

Although two embodiments of the invention have been shown, it will be understood to those skilled in the art that it is not so limited, but is susceptible of various other changes and modifications without departing from the spirit thereof.

I claim as my invention:

1. A valve structure for controlling the flow of pressurized fluid comprising:
   a tubular housing having a central axis,
   a planar stationary grid member disposed in said housing transverse to said axis and having a plurality of ports arranged in a pattern,
   a planar movable grid member received in said housing transverse to said axis and disposed in slidable face-to-face abutment with said stationary grid member,
   said movable grid member having a plurality of apertures arranged in said pattern,
   said housing having an internal wall of substantially the same cross-sectional configuration as said movable grid member but of larger cross-sectional area,
   means for slidably moving said movable grid member from a first position in which said ports and said apertures are in mutual registry to permit flow of fluid to a second position in which said ports and said apertures are out of registry with each other to block flow of fluid,
   said housing and said movable grid member at least partially defining a first space when said movable grid member is in said first position and a second and diametrically opposed space when said movable grid member is in said second position; and
   said stationary grid member having first passage means for admitting fluid to said second space during movement of said grid member to said second position and said housing having diametrically opposed second passage means for admitting fluid to said first space during movement of said grid to said first position, whereby the fluid pressure in said second space is effective to minimize the force required to move said movable grid member from the first to the second position, and, conversely, the fluid pressure in said first space is effective to minimize the force required to move said movable grid member from second to said first position.

2. The structure recited in claim 1 and further including:
   a second planar movable grid member received in the housing transverse to the axis and disposed in slidable face-to-face abutment with the opposite face of the stationary grid member,
   said second grid member having a plurality of apertures arranged in the port pattern, and
   means for independently moving said second grid member from a port blocking position to a port unblocking position.

3. The structure recited in claim 1 and further including:
   a second planar movable grid member received in the housing transverse to the axis and disposed in slidable face-to-face abutment with the opposite face of the stationary grid member,
   said second grid member having a plurality of apertures arranged in the same pattern as the ports,
   means for independently moving said second grid member from a port blocking position to a port unblocking position, and
   means for modifying the abutment pressure imposed on at least one of the grid members by the fluid,
   said last-mentioned means including an annular recess in the face of said one grid member and passage means providing a communication between said recess and the fluid.

References Cited by the Examiner

UNITED STATES PATENTS

| | | | |
|---|---|---|---|
| 2,827,260 | 3/1958 | Jordon | 251—282 X |
| 2,976,008 | 3/1961 | Ocker | 251—282 X |
| 2,993,488 | 7/1961 | Stec | 123—188 |
| 3,103,941 | 9/1963 | Watters | 137—614.21 X |
| 3,244,399 | 4/1966 | Jones et al. | 251—327 |

FOREIGN PATENTS

| | | |
|---|---|---|
| 646,140 | 11/1928 | France. |
| 15,311 | 9/1891 | Great Britain. |

WILLIAM F. O'DEA, *Primary Examiner.*

D. H. LAMBERT, *Assistant Examiner.*